United States Patent [19]

Matsumoto et al.

[11] Patent Number: 4,524,312
[45] Date of Patent: Jun. 18, 1985

[54] CONTROL FOR PUMPING DEVICES USED IN VEHICLES

[75] Inventors: Akio Matsumoto; Mitsuyoshi Yokota, both of Himeji, Japan

[73] Assignee: Mitsubishi Denki Kabushiki Kaisha, Tokyo, Japan

[21] Appl. No.: 549,183

[22] Filed: Nov. 4, 1983

[30] Foreign Application Priority Data

Nov. 12, 1982 [JP] Japan .................. 57-171905

[51] Int. Cl.³ .................................. B60T 13/66
[52] U.S. Cl. ......................... 318/481; 318/484; 303/20
[58] Field of Search ............. 318/484, 481, 645, 283, 318/306, 308, 385, 445; 303/10, 11, 12, 20

[56] References Cited

U.S. PATENT DOCUMENTS

| | | | |
|---|---|---|---|
| 3,435,298 | 3/1969 | Atkins et al. | 318/484 X |
| 3,566,229 | 2/1971 | Wickens | 318/308 |
| 3,638,091 | 1/1972 | Hosokawa et al. | 318/484 |
| 3,652,910 | 3/1972 | Urbain | 318/445 |
| 3,681,671 | 8/1972 | Elliott | 318/481 |
| 3,745,781 | 7/1973 | Rasmussen | 318/484 X |
| 3,949,284 | 4/1976 | Wright | 318/283 X |
| 4,000,450 | 12/1976 | Nurnberg | 318/484 X |
| 4,097,791 | 6/1978 | Bivens et al. | 318/484 |
| 4,107,588 | 8/1978 | Seiler | 318/484 |

FOREIGN PATENT DOCUMENTS

| | | | |
|---|---|---|---|
| 195886 | 12/1982 | Japan | 318/445 |
| 10208 | 1/1983 | Japan | 318/645 |

*Primary Examiner*—Vit W. Miska
*Assistant Examiner*—Bentsu Ro
*Attorney, Agent, or Firm*—Lowe King Price & Becker

[57] ABSTRACT

Disclosed is a control for a pumping device in a vehicle application in which, upon throwing a power switch (6), a capacitor (85) is charged and a power transistor (81) is rendered conductive thereby supplying a DC voltage from batteries (5) to a DC motor (2). The DC motor drives a pump (1) which in turn feeds pressure to a pressure-operating unit (10) for storage therein. If a given period of time has elapsed after throwing of the power switch, then the voltage charged on the capacitor increases to make a transistor (83) conductive and the power transistor (81) non-conductive. In other words, the DC motor is operated to provide pressure to the pressure-operating unit for only the given period of time after throwing of the power switch. Furthermore, upon closure of a brake actuator switch (4) another transistor (84) becomes conductive and the above transistor (83) becomes non-conductive. This renders the power transistor (81) conductive and supplies the DC voltage to the DC motor.

14 Claims, 4 Drawing Figures

CONTROL FOR PUMPING DEVICES USED IN VEHICLES

BACKGROUND OF THE INVENTION

1. Field of the Invention

The present invention relates to a control for pumps in a vehicle application. More particularly, it relates to an improved control for controlling a vacuum pump for supply of a negative pressure to a force multiplier or a vacuum tank generally included in a braking apparatus for vehicles.

2. Description of the Prior Art

FIG. 1 is an electric circuit diagram showing a conventional control technique for pumps used in vehicles. Referring to FIG. 1, the conventional control will be discussed with respect to its schematic structure. The primary function of a vacuum pump 1 is to supply a negative pressure to a pressure-operating unit 10. A representative pressure-operating unit 10 comprises a force multiplier or a vacuum tank generally included in a vehicle braking apparatus. As is well known in the art, the force multiplier functions to augment the force provided when the driver steps on the brake. The vacuum tank is used to store a vacuum pressure set up by the vacuum pump 1. The vacuum pump 1 is driven by a DC motor 2 which, combined with the vacuum pump 1, forms a vehicle pumping device. The DC motor 2 is controlled by a control circuit 3 which includes a power transistor 31 connected in series with the DC motor 2, a driver transistor 32 controlling operation of the power transistor 31, base resistors 33 and 34 for the respective transistors 31 and 32, a surge absorbing diode 35 and a base-emitter resistor 36. The DC motor 2 is fed with a DC voltage from batteries 5 via a power switch 6. A pressure detecting switch 41 is provided in conjunction with a force multiplier or a vacuum tank for detecting a negative pressure generated by the vacuum pump 1 and has a normally closed contact which is open when the negative pressure reaches a predetermined value.

FIG. 2 is a diagram which will give a better understanding of operation of the conventional control as shown in FIG. 1. Operation of the conventional control will be described by reference to FIGS. 1 and 2. Under the condition where the engine (not shown) has not started up and the vehicle is stopped, the negative pressure in the force multiplier or the vacuum tank is generally low and is close to the atmospheric pressure. The contact of the pressure detecting switch 41 is therefore in the closed position. Upon closure of the power switch 6 under these circumstances the driver transistor 32 is fed at its base with a low level signal from the pressure detecting switch 41 and rendered nonconductive. Current flows from the batteries into the base of the power transistors 31 through the power switch 6 and the base resistor 33, rendering the power transistor 31 conductive. In response to conduction of the power transistor 31, the DC voltage from the batteries 5 is supplied to the DC motor 2 which in turn rotates to activate the vacuum pump 1.

It is noted that the pressure in the force multiplier or the vacuum tank decreases gradually and the negative pressure increases. If the negative pressure in the force multiplier or the vacuum tank reaches a first predetermined value, then the normally closed contact of the pressure detecting switch 41 is opened. The driver transistor 32 becomes conductive in response to the base current flowing from the batteries 5 through the power switch 6 and the base resistor 34. As a result, the power transistor 31 becomes non-conductive and the DC motor 2 is no longer supplied with the DC voltage so that the vacuum pump 1 comes to a halt. As the negative pressure in the force multiplier or the vacuum tank decreases and drops to a second predetermined value, the contact of the pressure detecting switch 41 is closed again and the DC motor 2 is energized. The above described sequence of operations is repeated in such a manner as to keep the negative pressure in the force multiplier or the vacuum tank within the range from the first predetermined value to the second.

However, provided that braking is effected intermittently as seen in FIG. 2(a) in the conventional control, the negative pressure for activating the force multiplier demonstrates a sharp decline as plotted with the solid line in FIG. 2(b). Operation of the force multiplier is less powerful and demands application of an even greater force of stepping on the brake. In case of complicated braking operation, the control apparatus has the problem that the DC motor 2 is liable to inch and may enjoy only a very limited length of life.

SUMMARY OF THE INVENTION

Accordingly, it is the primary object of the present invention to provide a control for a pumping device in vehicle application in which, upon throw of a power switch without actuation of an actuator switch in a stopped state of the vehicle, a DC motor is driven to increase the pressure in a pressure-operating unit without the possibility of inching the DC motor.

In brief, a control for a pumping device according to the present invention is adapted so that upon throwing a power switch under non-actuated state of an actuator switch a DC motor is driven for a limited period of time to enable a pump and to activate a pressure-operating unit with the pressure from the pump while increasing the pressure.

The control according to the present invention constantly assures a desired amount of pressure in activating the pressure-operating unit and thus assures smooth activation of the pressure-operating unit because of the limited period of time during which the pump is driven after throwing of the power switch during a non-activation period of the pressure-operating unit.

In a preferred embodiment of the present invention, a first switching means is placed into a conductive state to supply the DC voltage from a DC power source to the DC motor in response to throwing of the power switch. Upon the passage of a given period of time after throwing of the power switch a second switching means is rendered conductive to place the first switching means into a non-conductive state. Furthermore, upon closure of the actuator switch a third switching means is rendered conductive and the second switching means non-conductive to thereby place the first switching means into a conductive state and to drive the DC motor. With the actuator switch in an open state, the third switching means is rendered conductive and the second switching means non-conductive, thereby making the first switching means conductive.

The preferred embodiment of the present invention, therefore, provides the capability to keep the pressure in the pressure-operating unit more nearly fixed since the DC motor is driven not only upon closure of the power switch or the actuator switch but also upon opening the actuator switch.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
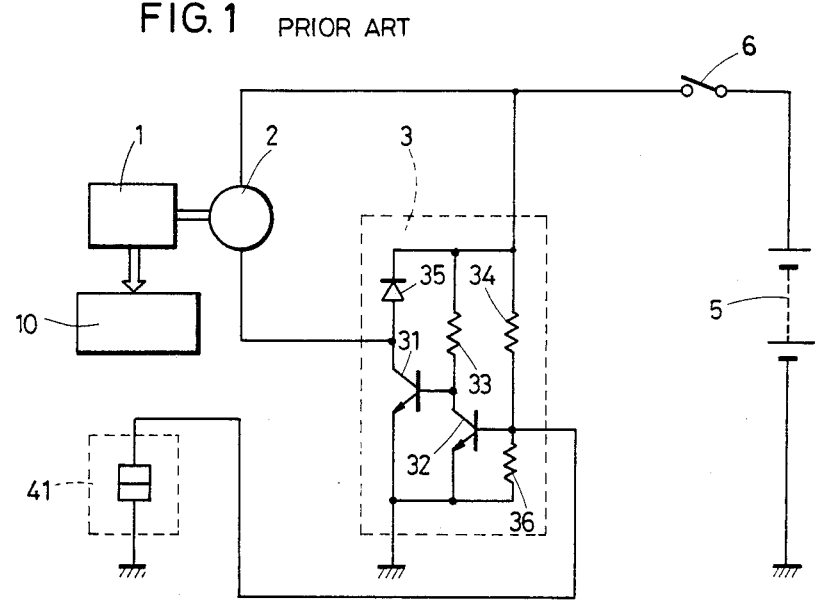
FIG. 1 is an elelctric circuit diagram of a control apparatus for a conventional pumping device in vehicle application.
Figure 2:
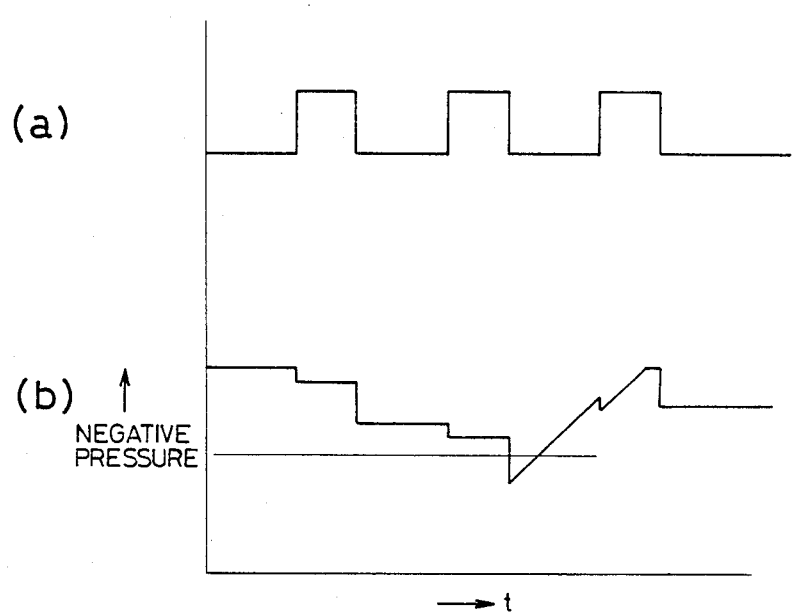
FIG. 2 is a diagram which will give a better understanding of operation of the conventional control as shown in FIG. 1.
Figure 3:
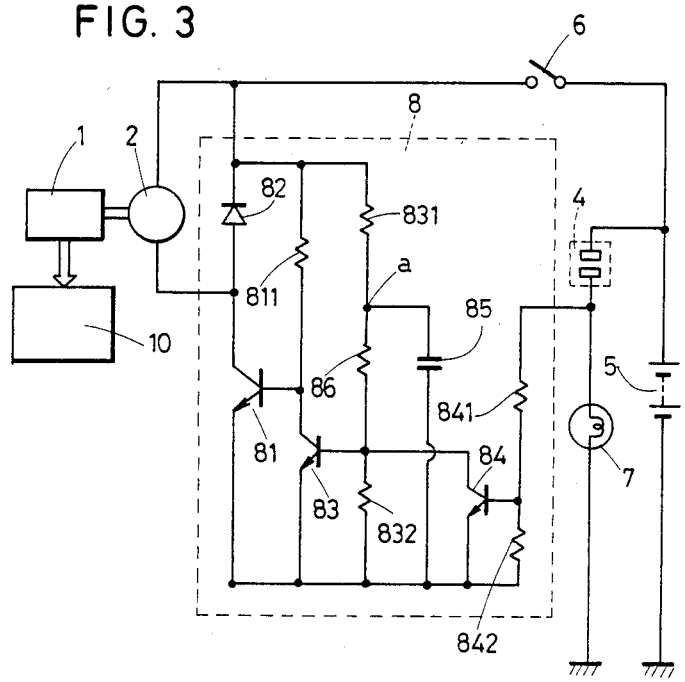
FIG. 3 is an elelctric circuit diagram of a preferred embodiment of the present invention.

FIG. 3 is an electric circuit diagram showing a preferred embodiment of the present invention. The embodiment as shown in FIG. 3 is similar to the above discussed circuit arrangement as in FIG. 1 except for the control circuit 8. In other words, the control circuit 8 is set up by comprising a power transistor 81 in a series connection with the DC motor 2, a base resistor 811, a surge absorbing diode 82, a first driver transistor 83 controlling the power transistor 81, a base resistor 831 and a base-emitter resistor 832 both for the first driver transistor 83, a second driver transistor 84 controlling the first driver transistor 83, a base resistor 841 and a base-emitter resistor 842 both for the second driver transistor 84, a capacitor 85 for setup of a time constant circuit, and a current-limiting resistor 86.

The following will describe operation of the above embodiment of the present invention. If the power switch 6 is thrown on while the vehicle is at a stop, the capacitor 85 is charged by way of the base resistor 831. With the capacitor 85 so charged, the voltage at point a or the junction of the base resistor 831 and the voltage on capacitor 85 is low and the first driver transistor 83 is non-conductive. Under these circumstances the power transistor 81 becomes conductive permitting the DC motor 2 to be supplied with a DC voltage from a battery or batteries 5. The result is that the DC motor 2 rotates and the negative pressure increases in the pressure-operating unit 10 such as a force multiplier or a vacuum tank.

Thereafter, the first driver transistor 83 becomes conductive when the capacitor 85 is gradually charged up so as to increase the voltage at point a over a voltage value at which base current is large enough to render the first driver transistor 83 conductive. In response to conduction of the first driver transistor 83 the power transistor 81 becomes non-conductive to shut off power supply to the DC motor 2 and to force the vacuum pump 1 into a stop. In other words, once the power switch 6 has been thrown on without closing the actuator switch 4 the vacuum pump 1 is driven only for a predetermined period of time as determined by a time constant including the capacitor 85. Furthermore, provided that the vehicle is being driven and braking is effected together with closure of the normally open contact of the brake actuator switch 4, base current runs through the base resistor 841 and the second driver transistor 84. This results in rendering the second driver transistor 84 conductive and the first driver transistor 83 non-conductive. The power transistor 81 is accordingly made conductive to supply the DC voltage to the DC motor 2 and activate the vacuum pump 1. As a result, the negative pressure in the pressure-operating unit 10 increases.

If braking is completed and the normally open contact of the brake actuator switch 4 opens, then the second driver transistor 84 becomes non-conductive. This renders the first driver transistor 83 conductive and the power transistor 81 non-conductive, thus stopping the vacuum pump 1.

As stated previously, in the above embodiment, the negative pressure in the pressure-operating unit 10 during braking increases by virtue of closure of switch 4 while braking and by activation of the motor 2 for a predetermined time in response to closure of switch 6. These features provide more powerful operation of a braking force multiplier during braking. With this structure, the braking distance is kept short even through the force of stepping on the brake pedal is weak.

Figure 4:
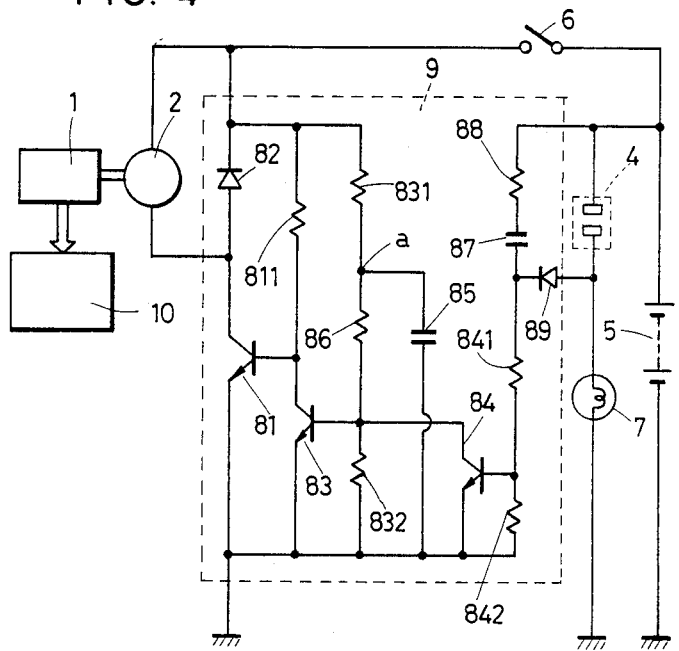
FIG. 4 is an elelctric circuit diagram of another embodiment of the present invention.

In FIG. 4, there is illustrated an electric circuit diagram of another embodiment of the present invention. A control circuit 9 in the embodiment of FIG. 4 is analogous to the control circuit 8 as shown in FIG. 3 except in the following aspects. Connected between the positive polarity side of the batteries 5 and the base resistor 841 is a series path including a resistor 88 and a capacitor 87, whereas connected between the brake actuator switch 4 and the base resistor 841 is a reverse blocking diode 89.

By provision of the resistor 88 and the capacitor 87 in the control circuit 9, the second driver transistor 84 is supplied with base current through the resistor 88 and the capacitor 87 for a limited period of time even when the actuator switch 4 is open. For this reason the second driver transistor 84 continues conducting to activate the vacuum pump 1. This embodiment is satisfactory in assuring sufficient negative pressure in the pressure multiplier during braking and smooth braking since, with actuator switch 4 in an open state, the vacuum pump 1 is activated for a given period of time after throwing of the power switch 6 and for a given period of time after opening of the actuator switch 4.

Whereas the pressure-operating unit responsive to the pressure from the pump has particularly been described and illustrated in terms of the braking force multiplier and the vacuum tank in the foregoing disclosure, the present invention should not be limited thereto and is equally applicable to door switching devices and other mechanisms.

Furthermore, it is obvious that the pressure-operating unit has been illustrated as being driven with the negative pressure from the vacuum pump 1 but it may be activated with a positive pressure from a compressor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control for a pumping device for use in vehicles comprising:
   a DC power supply;
   a DC motor;

a pumping device for use in the vehicles, including a pump activated by said DC motor for generating a pressure;

a power switch for supplying a DC voltage from said DC power supply to said DC motor;

a pressure-operating unit operable by the pressure from said pump;

an actuator switch for actuating said DC motor; and a control means for enabling said DC motor for only a given period of time in response to actuating of said power switch when said actuator switch is not actuated.

2. A control for a pumping device for use in vehicles as set forth in claim 1 wherein said control means comprises:

a first switching means placed into a conductive state in response to actuation of said power switch for supply the DC voltage from said DC power supply to said DC motor; and 3. A control for a pumping device for use in vehicles as set forth in claim 2 wherein said control means includes:

a third switching means placed into conductive state in response to closure of said actuator switch for rendering said second switching means non-conductive and said first switching means conductive.

4. A control for a pumping device for use in vehicles as set forth in claim 3 further comprising:

a time constant circuit for rendering said third switching means conductive for a given period of time in response to opening of said actuator switch.

5. A control for a pumping device for use in vehicles comprising a motor for activating a pumping means for generating a pressure, used in the vehicle, power switch means for supplying a voltage from a power supply to said motor, actuator switch means responsive to operation of a device requiring utilization of the pressure generated by the pumping means, controlled switching means connecting said motor to the power supply for energizing said motor, first energizing means for activating said motor in response to activation of said actuator switch means, second energizing means for activating said motor for a predetermined, limited, period of time in response to activation of said power switch means during a condition wherein said actuator switch means is not activated, and timing means for deactivating said motor after passage of said predetermined period of time from activation of said power switch means under said condition wherein said actuator switch means is not activated.

6. A control as recited in claim 5 wherein said first energizing means comprises deactivating means for deactivating said motor in response to deactivation of said actuator switch means, said deactivating means including additional timing means responsive to deactivation of said actuator switch means for determining an additional time period and for causing deactivation of said motor to occur only subsequent to passage of said additional time period after deactivation of said actuator switch means.

7. A control as recited in claim 6 wherein said actuator switch means comprises contact means operated responsively to activation of a vehicle braking means, and wherein said additional timing means comprises means responsive to termination of operation of said contact means by activating, for said additional time period, said controlled switching means, thereby energizing said motor to said additional time period.

8. A control as recited in claim 5 wherein said actuator switch means comprises contact means operated responsively to activation of a vehicle braking means and said first energizing means comprises means responsive to operation of said contact means by activating said controlled switching means thereby energizing said motor.

9. A control as recited in claim 8 wherein said power switch means is connected between said motor and the power supply, thereby causing said first energizing means to activate said motor in response to activation of said actuator switch means only if said power switch means is activated.

10. A control as recited in claim 8 wherein said second energizing means and said timing means are connected to said power switch means and to said controlled switch means for activating said controlled switch means for said predetermined limited time period responsive to activation of said power switch means, thereby causing said motor to be activated for at least said predetermined time period in response to activation of either said power switch means or said actuator switch means.

11. A control as recited in claim 7 wherein said additional timing means comprises RC circuit means connected to shunt said contact means.

12. A control as recited in claim 5 wherein said first energizing means is operable for activating said motor independently of current drawn by said motor.

13. A control for a pumping device for use in vehicles comprising a DC motor for activating a pumping means for generating pressure, used in the vehicle, power switch means for supplying a voltage from a power supply to said DC motor, actuator switch means responsive to operation of a device requiring utilization of the pressure generated by the pumping means, controlled switching means connecting said motor to the power supply for energizing said motor, first energizing means for activating said motor in response to activation of said actuator switch means, second energizing means for activating said motor for a predetermined, limited, period of time in response to activation of said power switch means during a condition wherein said actuator switch means is not activated, and timing means for activating said motor for a predetermined time period in response to actuation of said power switch means and in response to a deactivated condition of said actuator switch means, and for deactivating said motor after passage of said predetermined time period wherein said power switch means is actuated and said actuator switch means is deactivated, said timing means further including means responsive to said actuator switch means for activating said motor for so long as said actuator switch means is activated and said power switch means is activated.

14. A control as recited in claim 13 wherein said actuator switch means comprises brake switch means, and said first energizing means includes deactivating means for deactivating said motor, said deactivating means including first means for deactivating said motor directly in response to deactivation of said power switch means and second means for deactivating said motor a predetermined time period after deactivation of said brake switch means.

* * * * *